United States Patent
Chikkali et al.

(10) Patent No.: US 10,465,019 B2
(45) Date of Patent: Nov. 5, 2019

(54) CATALYSTS FOR PREPARATION OF ULTRA HIGH MOLECULAR WEIGHT POLYETHYLENE (UHMWPE) AND PROCESS FOR PREPARATION THEREOF

(71) Applicant: Council of Scientific & Industrial Research, New Delhi, Delhi (IN)

(72) Inventors: Samir Hujur Chikkali, Maharashtra (IN); Ketan Patel, Maharashtra (IN)

(73) Assignee: Council of Scientific and Industrial Research, New Dehli (IN)

( * ) Notice: Subject to any disclaimer, the term of this patent is extended or adjusted under 35 U.S.C. 154(b) by 68 days.

(21) Appl. No.: 15/739,341

(22) PCT Filed: Jun. 22, 2016

(86) PCT No.: PCT/IN2016/050192
§ 371 (c)(1),
(2) Date: Dec. 22, 2017

(87) PCT Pub. No.: WO2016/207909
PCT Pub. Date: Dec. 29, 2016

(65) Prior Publication Data
US 2018/0171039 A1    Jun. 21, 2018

(30) Foreign Application Priority Data
Jun. 22, 2015 (IN) .......................... 1845/DEL/2015

(51) Int. Cl.
*C08F 110/02* (2006.01)
*C08F 4/64* (2006.01)

(52) U.S. Cl.
CPC ........ *C08F 4/64048* (2013.01); *C08F 110/02* (2013.01); *C08F 2410/01* (2013.01); *C08F 2500/01* (2013.01)

(58) Field of Classification Search
CPC .... C08F 10/02; C08F 4/64048; C08F 110/02; C08F 2500/01; C08F 2410/01
USPC ........................................................ 526/188
See application file for complete search history.

(56) References Cited

U.S. PATENT DOCUMENTS 7,671,159 B2    3/2010 Rastogi et al.
2014/0221588 A1    8/2014 Sarma et al.

FOREIGN PATENT DOCUMENTS

JP    2000-111960    4/2000

OTHER PUBLICATIONS

Fătu et al., "The Thermal Behaviour of Some Co(II) Complex Combinations with Schiff Bases", J. of Thermal Analysis and Calorimetry, Kluwer Academic Publishers, Dordrecht, NL; 71(2): 521-529, Feb. 2003.*
International Search Report and Written Opinion for PCT/IN2016/050192 dataed Nov. 24, 2016.

(Continued)

Primary Examiner — William K Cheung
(74) Attorney, Agent, or Firm — Fish & Richardson P.C.

(57) ABSTRACT

The present invention relates to novel polymerization catalysts. More particularly, the present invention relates to a novel catalysts for the preparation of ultra high molecular weight polyethylene (UHMWPE) and process for preparation thereof. The present invention further relates to a process for the preparation of disentangled ultra high molecular weight polyethylene (dis-UHM-WPE).

37 Claims, 3 Drawing Sheets

(56) References Cited

OTHER PUBLICATIONS

Ibrahim et al: "Synthesis and Structural Studies on Homo-and Heterobinuclear Complexes of Cu(ll), Ni (II) and Co (II) with Arylideneanthranilic Acid Schiff Bases", Journal of the Chinese Chemical Society; 37(4):345-352, Aug. 1990.

Pandey et al: "Heterogeneity in the Distribution of Entanglement Density during olymerization in Disentangled Ultrahigh Molecular Weight Polyethylene", Macromolecules, American Chemical Society, US, (44)12, 28:4592-4960, Jun. 2011.

* cited by examiner

CATALYSTS FOR PREPARATION OF ULTRA HIGH MOLECULAR WEIGHT POLYETHYLENE (UHMWPE) AND PROCESS FOR PREPARATION THEREOF

This application is a U.S. national stage application filed under 35 U.S.C. § 371 of International Application Serial No. PCT/IN2016/050192, which was filed 22 Jun. 2016, which claims priority to India Application No. 1845/DEL/2015, filed 22 Jun. 2015, the contents of which are incorporated by reference in their entirety.

FIELD OF THE INVENTION

The present invention relates to novel polymerization catalysts. More particularly, the present invention relates to a novel catalyst for the preparation of ultra high molecular weight polyethylene (UHMWPE) and process for preparation thereof. The present invention further relates to a process for the preparation disentangled ultra high molecular weight polyethylene (dis-UHMWPE).

BACKGROUND AND PRIOR ART

UHMWPE has a molecular weight of at least 1,000,000 Da, which is 10 to 100 times greater than the molecular weight of high-density polyethylene (HDPE). UHMWPE offers major advantages in increased impact resistance, tensile strength, abrasion resistance, and stress-crack resistance. UHMWPE can be produced by Ziegler polymerization. The process requires exceptionally pure ethylene and other raw materials. Like conventional HDPE, UHMWPE made by Ziegler polymerization has a broad molecular weight distribution Mw/Mn (Mw is the weight average molecular weight, Mn is the number average molecular weight) of within the range of 5 to 20.

However, UHMWPE with a narrow molecular weight distribution Mw/Mn of less than 5 have improved mechanical properties. Newly developed metallocene and single-site catalysts advantageously provide polyethylene and other polyolefins with very narrow molecular weight distribution (Mw/Mn from 1 to 5). The narrow molecular weight distribution results in reduced low molecular weight species and higher Mn which further improves abrasion resistance. These new catalysts also significantly enhance incorporation of long-chain a-olefin comonomers into polyethylene, and therefore reduce its density. Unfortunately, however, these catalysts produce polyethylene having a lower molecular weight than that made with Ziegler-Natta catalysts. It is extremely difficult to produce UHMWPE with conventional metallocene or single-site catalysts.

U.S. Pat. No. 6,174,976 discloses novel olefin polymerization catalysts based on neutral nickel complexes of bidentate ligands containing a nitrogen atom and an oxygen atom and a process for the preparation of polyolefins using such catalysts. Preferred ligands possess imine and carboxylate groups. A batch or continuous process for the preparation of polyolefins comprising contacting, at a temperature from about −100° C. to 200° C., one or more monomers of the formula $R_1CH=CHR_2$ with, (i) a compound of the formula I, (ii) a suitable nickel compound, and optionally, (iii) a neutral Lewis

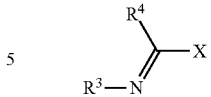

PCT Appl. No. 2004052980 discloses compound suitable for use as a catalyst for ring opening polymerisation reactions for example for the polymerisation of lactones, lactides etc, the catalyst comprising the reaction product of (i) an alkoxide, halide, condensed alkoxide, amide, condensed amide, mixed halo-alkoxide or, mixed halo-amide, sulphonic acid derivative, sulphonamide, silanol or silylamide of titanium zirconium, hafnium or aluminium or a mixture thereof, and (ii) a complexing compound selected from the list comprising oximes, hydroxy-Schiff bases, 8-hydroxyquinoline derivatives, 10-hydroxybenzo-[h]-quinoline derivatives, hydrazones and substituted phenols. The catalyst composition is preferably of the following general formula Yn-(X.Z)-M-Lx where Y represents a monovalent ligand (such as alkoxy, amide, sulphonato or silanoxy), n represents the valency of the metal M, x is the no of moles of complexing compound associated with each metal atom and z is the number of covalent bonds formed between each L and the metal M. For example, the catalyst composition is represented by the following structural diagram:

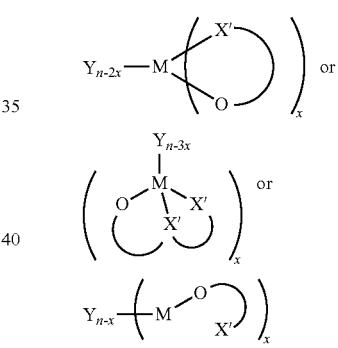

Article titled "Olefin polymerization" reports olefin polymerisation by using methylaluminoxane (MAO).

Article titled "Aldehyde and ketones" reports the synthesis and mechanism for imine formation.

European patent 0874005 discloses olefin polymerization catalyst exhibiting excellent polymerization activities, a process for olefin polymerization using the catalyst, a novel transition metal compound useful for the catalyst, and an α-olefin/conjugated diene copolymer having specific properties. The olefin polymerization catalyst of the invention comprises (A) a transition metal compound of formula (I), and (B) an organometallic compound, an organoaluminum oxy-compound or an ionizing ionic compound. The novel transition metal compound of the invention is a compound of formula (I) wherein M is a transition metal atom of Group 3 or 4 of the periodic table; m is an integer of 1 to 3; $R_1$ is a hydrocarbon group, etc.; $R_2$ to $R_5$ are each H, a halogen, a hydrocarbon group, etc.; $R_6$ is a halogen, a hydrocarbon group, etc.; n is a number satisfying a valence of M; and X is a halogen, a hydrocarbon group, etc.

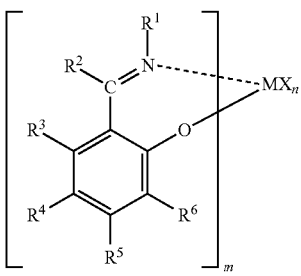

PCT Appl. No. 2013020896 discloses Group 4 transition metal complexes of bidentate iminonaphthol pro-ligands are claimed. These can be used as catalysts to polymerise olefins, preferably ethylene, inter alia to prepare ultra high molecular weight polyethylene having a narrow molecular weight distribution, due to the single-site nature of the catalyst.

US Pat. Appl. No. 20100056737 discloses a process of manufacturing high, very high, and ultra high molecular weight polymers comprising predominantly ethylene monomers. Ethylene is reacted in the presence of a catalyst system to produce a polymer having a viscosimetrically-determined molecular weight of at least $0.7 \times 10^6$ g/mol. The catalyst system generally includes a bridged metallocene catalyst compound, optionally with a co-catalyst.

Article titled "The synthesis and X-ray structure of a phenoxyimine catalyst tailored for living olefin polymerisation and the synthesis of ultra-high molecular weight polyethylene and atactic polypropylene" by Marc-Stephan Weiser et al. published in *Journal of Organometallic Chemistry*, 2006,691 (13), pp 2945-2952 reports synthesis of a phenoxyimine catalyst (bis-(N-(3',5'-diiodo-salicylidene)-2,6-difluoroaniline)-titanium(IV)-dichloride. The ligand as well as the complex have been fully characterised. An X-ray structure of the titanium complex was obtained. After activation with MAO, it was used as highly active catalyst in living olefin polymerisation of ethylene and propylene.

U.S. Pat. No. 6,369,177 discloses an olefin polymerization catalyst exhibiting excellent olefin polymerization activity and capable of producing polyolefins of excellent properties and to provide a process for olefin polymerization using this catalyst. The olefin polymerization catalyst comprises a transition metal imine compound (A) represented by the following formula (I-a) or (I-b) and at least one compound (B) selected from an organometallic compound (B-1), an organoaluminum oxy-compound (B-2) and a compound (B-3) which reacts with the transition metal imine compound (A) to form an ion pair;

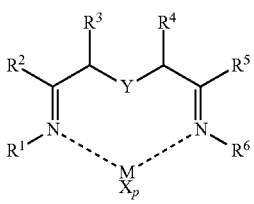

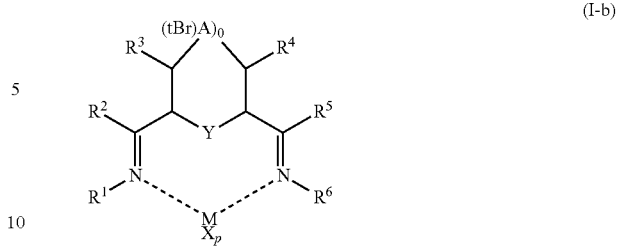

PCT Appl. No. 2016005961 (IN2014MUM2267) discloses a heterogeneous single site catalyst immobilized on an inorganic oxide support and a method for the synthesis of the same using a step of generating a Schiff base imine ligand on the inorganic oxide support followed by lithiation and titanation. The use of the single site catalyst of the present disclosure is for polymerizing ethylene to obtain dis-entangled ultra-high molecular weight polyethylene. A method for immobilizing a single site catalyst on an inorganic oxide support, said method comprising the following steps: a. functionalizing said support by treating with a reagent to obtain a functionalized inorganic oxide support; b. treating said functionalized inorganic oxide support with a hydroxyl group containing aldehyde to obtain an inorganic oxide support with a Schiff base imine ligand; c. lithiating said inorganic oxide support with the Schiff base imine ligand with a lithiating agent to obtain an inorganic oxide support with a lithiated Schiff base imine ligand; and d. treating said inorganic oxide support with the lithiated Schiff base imine ligand with a titanium halide to obtain said immobilized single site catalyst.

Article titled "Heterogeneity in the distribution of entanglement density during polymerization in disentangled ultrahigh molecular weight polyethylene" by Anurag Pandey et al. published in *Macromolecules*, 2011, 44 (12), pp 4952-4960 reports ethylene polymerization using [3-t-Bu-2-O—C6H3CHdN(C6F5)]2TiCl2 and MAO.

Article titled "FI catalyst for polymerization of olefin" by S. Damavandi et al. published in INTECH, 2012 reports FI catalysts can be synthesized by treating the phenoxy-imine ligands and transition metal halides to furnish FI catalysts.

Article titled "Influence of catalytic systems on the synthesis of (dis)entangled UHMWPE and its implications on mechanical properties" by Dario Romano published as thesis 2014 reports synthesis and characterisation of UHMWPE.

However, a drawback of such phenoxyimine-based catalysts is that the phenoxy group does not provide sufficient rigidity to prevent the resulting metallic complex from adopting different conformations leading to the presence of multiple catalytic sites. Furthermore, phenoxy groups only have a limited number of sites which can bear substituents, these being needed for tailoring and fine-tuning in order to increase catalytic activity and/or enhance the control over the UHMWPE microstructure (short-chain branching, long-chain branching etc).

Thus a new family of single-site catalysts are needed, which have ligands that are more rigid, are easier to fine-tune with a larger number of possible substituents but are also capable of preparing dis-UHMWPE. Accordingly, present inventors developed a novel olefin polymerization catalyst comprising iminesulfonate or iminecarboxylate ligands for the synthesis of disentangled ultrahigh molecular weight polyethylene (dis-UHMWPE) with improved physical and mechanical properties.

OBJECTIVE OF THE INVENTION

The main objective of the present invention is to provide a novel olefin polymerization catalyst.

Another objective of the present invention is to provide a novel olefin polymerization catalyst comprising metal complexes of Formula (I) containing iminesulfonate ligands or iminecarboxylate ligands.

Still another objective of the present invention is to provide a novel olefin polymerization catalyst comprising metal complexes of Formula (I) containing iminesulfonate ligands and process of preparation thereof.

Yet another objective of the present invention is to provide a novel olefin polymerization catalyst comprising metal complexes of Formula (I) containing iminecarboxylate ligands and process of preparation thereof.

Still yet another objective of the present invention is to provide a novel process for olefin polymerization using the olefin polymerization catalysts of Formula (I).

SUMMARY OF THE INVENTION

Accordingly, the present invention provides a novel olefin polymerization catalyst comprising metal complexes of formula (I).

Abbreviations Used

UHMWPE—ultra high molecular weight polyethylene
dis-UHMWPE—disentangled ultra high molecular weight polyethylene
DMSO—Dimethyl sulfoxide

DETAILED DESCRIPTION OF THE INVENTION

Figure 1:
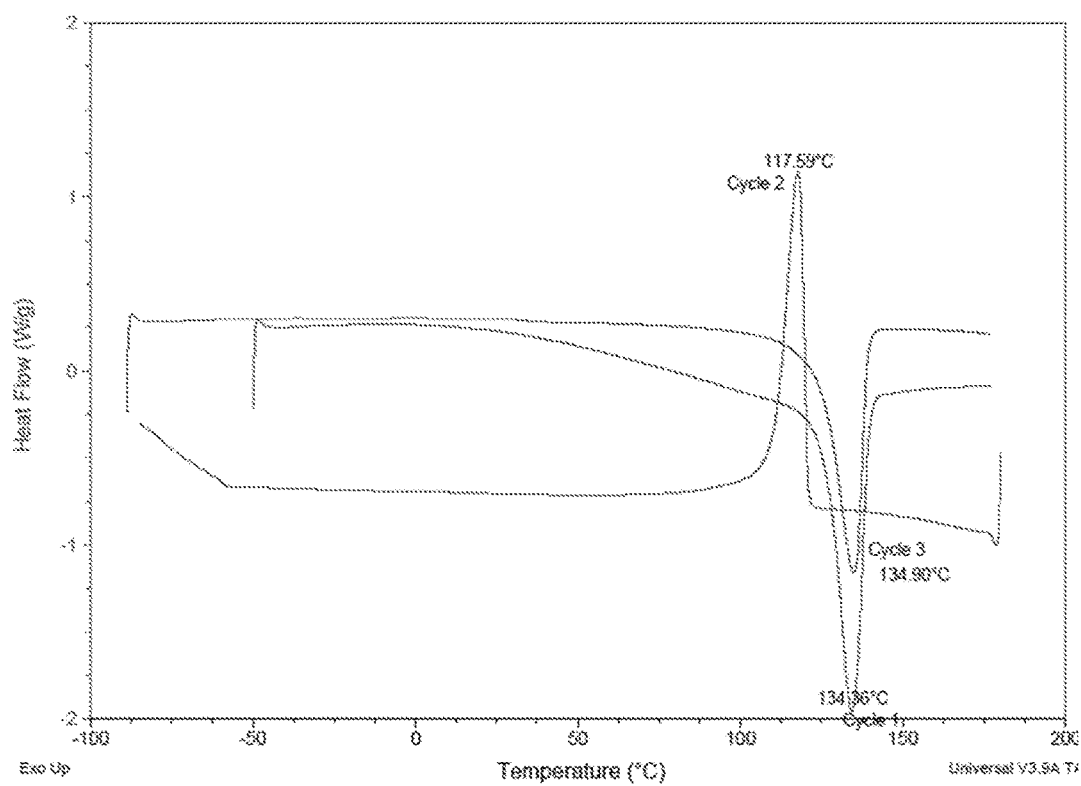
FIG. 1: DSC heating and cooling curves for the polyethylene P1.
Figure 2:
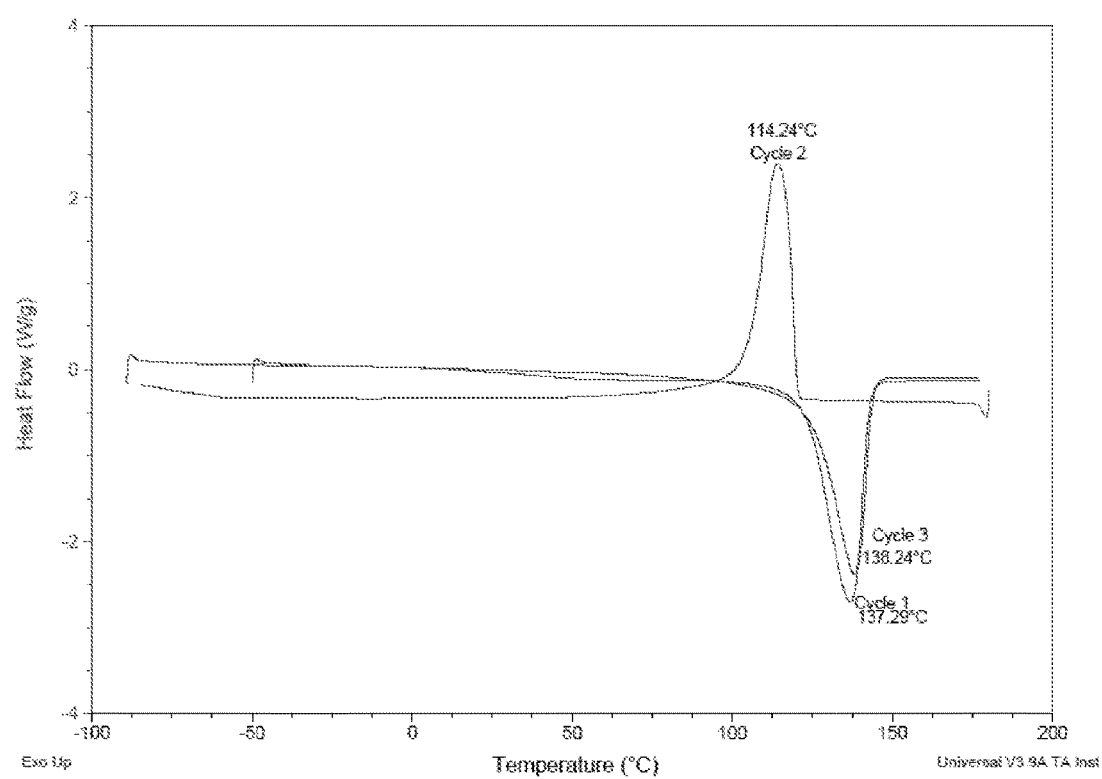
FIG. 2: DSC heating and cooling curves for the polyethylene P2.
Figure 3:
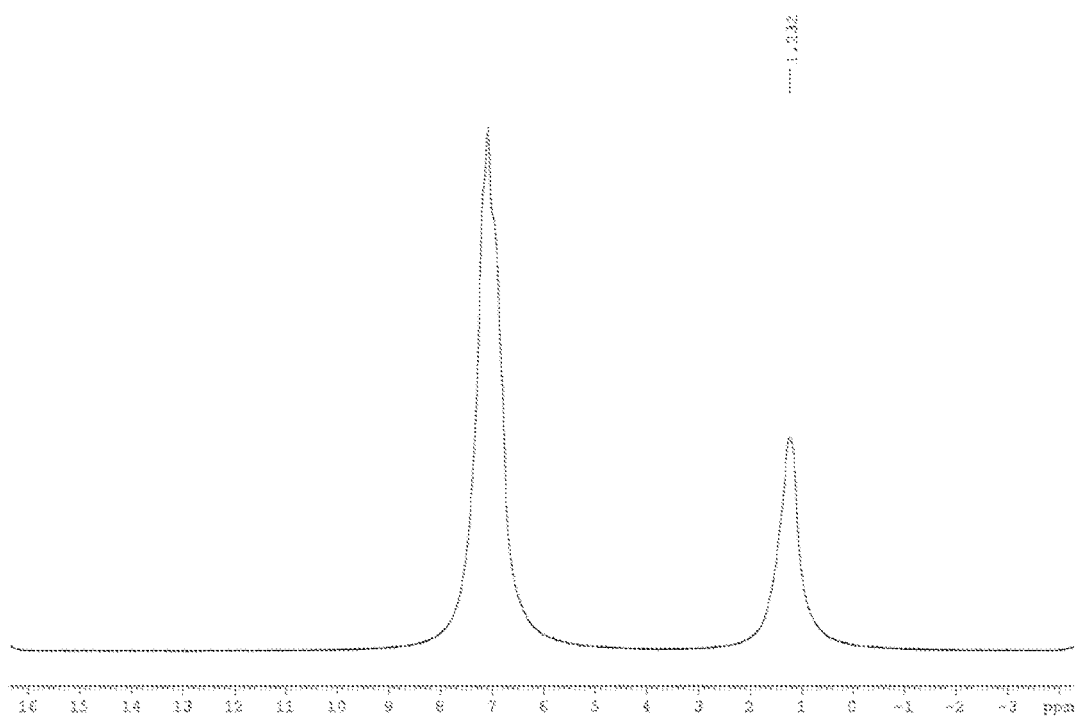
FIG. 3: $^1$H NMR of polyethylene P1 measured at 130 C in TCB-$C_6D_6$ mixture.

The invention will now be described in detail in connection with certain preferred and optional embodiments, so that various aspects thereof may be more fully understood and appreciated.

The present invention provides a novel olefin polymerization catalyst comprising metal complexes of formula (I) containing iminesulfonate ligands or iminecarboxylate ligands.

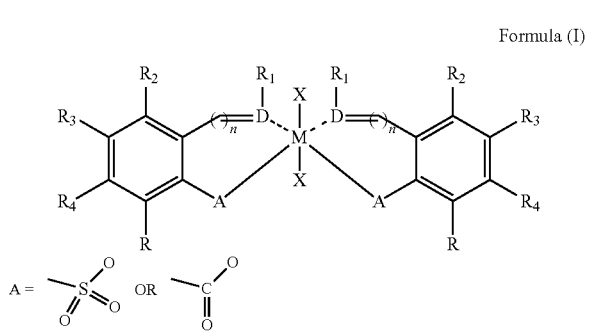

Formula (I)

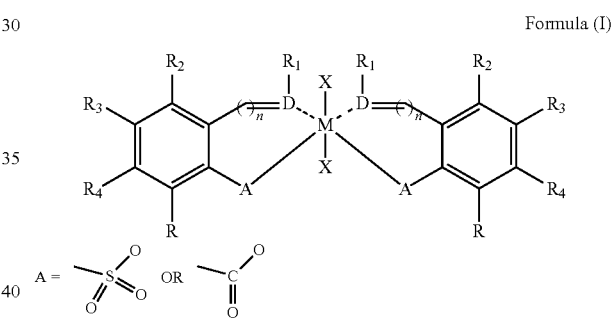

Formula (I)

Wherein

M is a transition metal atom of Group 3 to Group 11 of the periodic table; said transition metal is titanium;

A is sulfonate ($SO_3$) or carboxylate ($CO_2$);

When n=0, D=N=CH—; OR when n=1, D=N;

X=halogen, Cl, Br, I, $BF_4$, OAc;

R, $R_1$ to $R_4$ may be the same or different, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring. $R_1$ may be any aromatic compound, or mono, di, tri, tetra, penta substituted phenyl compound. One or more or all five substituent could be F, Cl, Br, I.

In an embodiment, the present invention provides a process for the preparation of a novel olefin polymerization catalyst comprising metal complexes of Formula (I).

In another embodiment, the present invention provides a process for the synthesis of disentangled ultra high molecular weight polyethylene (dis-UHMWPE) using catalysts of Formula (I).

Wherein

M is a transition metal atom of Group 3 to Group 11 of the periodic table, said transition metal is titanium;

A is sulfonate ($SO_3$) or carboxylate ($CO_2$);

When n=0, D=N=CH_; OR when n=1, D=N,

X=halogen, Cl, Br, I, $BF_4$, OAc;

R, $R_1$ to $R_4$ may be the same or different, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring, $R_1$ may be any aromatic compound, or mono, di, tri, tetra, penta substituted phenyl compound, one or more or all five substituent could be F, Cl, Br, I.

In preferred embodiment, said transition metals are selected from titanium, zirconium, hafnium, vanadium, ytterbium and niobium.

In another preferred embodiment, said compound of Formula (I) is selected from Bis[2-(((2,3,4,5,6-pentaflourophenyl)imino)methyl)benzenesulfonato]titanium(IV) Dichloride or Bis[2-(((4-methoxybenzylidene)amino)benzoate]Ti (IV) Dichloride. In an embodiment, the present invention provides a process for the preparation of catalyst of Formula (I) comprising the steps of:
a) stirring the reaction mixture of sodium salt of aldehyde and amine in suitable solvent in presence of alkyl/aryl sulfonic/carboxylic acid followed by refluxing the reaction mixture at temperature ranging from 140 to 160° C. for the period ranging from 4 h to 6 h to obtain imine compound;
b) adding organic solvent solution of metal halide to a stirred solution of compound of step (a) in suitable solvent at the temperature ranging from −78° C. to 80° C. followed by stirring the reaction mixture for the time period ranging from 18 to 20 h at the temperature ranging from 25° C. to 40° C. to obtain compound of Formula (I) wherein B is sulfonate group.

In preferred embodiment, said sodium salt of aldehyde is selected from a sodium salt of 2-formylbenzenesulfonic acid, sodium 2-formyl-6-methylbenzenesulfonate, and sodium 2-(tert-butyl)-6-formylbenzenesulfonate.

In another preferred embodiment, said amine is aliphatic or aromatic; preferably said amine is aromatic; more preferably said amine is 2,3,4,5,6-pentafluoroaniline. In another preferred embodiment, the aldehyde is 2,6-difluorobenzaldehyde, anisaldehyde, benzaldehyde.

In still another preferred embodiment, said solvent of step (a) is selected from dimethyl formamide, dimethyl sulfoxide, methanol, acetonitrile, benzonitrile.

In yet another preferred embodiment, said alkyl/aryl sulfonic acid is selected from p-toluenesulfonic acid, methane sulfonic acid, acetic acid, and trifluromethane sulfonic acid.

In yet another preferred embodiment, said organic solvent of step (b) is selected from toluene, xylene, hexane, heptane.

In still yet another preferred embodiment, said metal tetrahalide is selected from titanium tetrachloride, zirconium tetrachloride, titanium tetrabromide, zirconium tetrabromide.

In still yet another preferred embodiment, said solvent of step (b) is selected from dimethyl formamide, dimethyl sulfoxide, toluene, diethyl ether, dioxane.

In another embodiment, the present invention provides a process for the preparation of catalyst of Formula (I) comprising the steps of:
a) stirring the reaction mixture of aldehyde and amine in suitable solvent in presence of alkyl/aryl sulfonic/carboxylic acid followed by refluxing the reaction mixture at temperature ranging from 150-160° C./65 to 70° C. for the period ranging from 4 h to 6 h to obtain amino compound;
b) adding alkyllithium/n-hexane or sodium hydride/THF solution to a stirred solution of step (a) in solvent at the temperature ranging from −78° C. to 80° C. followed by stirring the reaction mixture for the time period ranging from 3 to 4 h at the temperature ranging from 25° C. to 40° C.;
c) adding solution of metal halide in organic solvent to a solution of step (b) at the temperature ranging from −78° C. to 80° C. followed by stirring the reaction mixture for the time period ranging from 18 to 20 h at the temperature ranging from 25° C. to 40° C. to obtain compound of Formula (I) wherein B is sulfonate or carboxylate group.

In preferred embodiment, said amine is selected from 2-amino-6-methylbenzoic acid, anthranilic acid, 2-amino-6-tert-butylbenzoic acid.

In another preferred embodiment, said aldehyde is selected from 2,3,4,5,6-pentafluoroaldehyde, 2,6-difluoroaldehyde, anisaldehyde, benzaldehyde.

In still another preferred embodiment, said solvent of step (a) is polar solvent; said solvent is alcohol; said alcohol is selected from methanol, ethanol, propanol.

In yet another preferred embodiment, said solvent of step (b) is tetrahydrofuran, toluene, diethyl ether, dioxane.

In still yet another preferred embodiment, said organic solvent is selected from toluene, xylene, hexane, heptane.

In still yet another preferred embodiment, said metalhalide is selected from titanium tetrachloride, zirconium tetrachloride, titanium tetrabromide, zirconium tetrabromide.

The presence of an acidic group in the compounds of Formula (I) increases the electron density on the metal centre due to extensive conjugation and makes them comparatively more stable. The appropriate combination of heteroatom and an acidic group can regulate the electron density at the metal centre in such a way that it reduces formation of undesirable multi-site catalyst under defined conditions.

In still another embodiment, the present invention provides a process for olefin polymerizations using polymerization catalysts of Formula (I) in the presence of a co-catalyst.

In preferred embodiment, the present invention provides a process for the preparation of disentangled ultra high molecular weight polyethylene using said polymerization catalysts of Formula (I) in the presence of a co-catalyst comprising the steps of:
a) Mixing the co-catalyst in a solvent followed by pressurizing the ethylene gas in reaction vessel;
b) Polymerizing ethylene by addition of the polymerization catalysts of formula (I) dissolved in solvent at the temperature ranging from 0 to 45° C.

In another preferred embodiment, said co-catalyst is selected from methylaluminoxane (MAO) and trialkylaluminium.

In still another preferred embodiment, said solvent of step (b) is hydrocarbon; preferably said solvent is saturated or unsaturated hydrocarbon; preferably said solvent is selected from toluene, xylene, heptane, decane, dodecane.

In yet another preferred embodiment, said polymerisation temperature for preparation of disentangled ultra high molecular weight polyethylene is ranging from 0 to 45° C.; preferably said temperature ranging from 35 to 40° C.

In still yet another preferred embodiment, said polymerization reaction is carried out in continuous or batch mode.

In still yet another preferred embodiment, said polymerization is carried out under a pressure of about 1 to 10 bars.

In still yet another preferred embodiment, the concentration of said catalyst is in the range of 1 to 10 µmol.

In still yet another preferred embodiment, said co-catalyst system may comprise an optional scavenger that may be selected from triethylaluminium, triisobutylaluminum, tris-n-octylaluminium, tetraisobutyl-dialuminoxane, diethyl zinc, tris-n-hexyl aluminum or diethylchloro aluminum.

In still yet another preferred embodiment, the average molecular weight of said disentangled ultra high molecular weight polyethylene is in the range of 1 to 10 million g/mol.

The disclosed neutral nickel complexes in the U.S. Pat. No. 6,174,976 form five membered (using bidentate ligand) constrained ring as shown in the following structure (which has been claimed in the above US patent). Such five membered rings are highly strained and unstable, leading to undefined catalytic species. In contrast, inventor catalysts are capable of forming six, seven membered ring and thus provide enhanced stability. Therefore, the claimed metal catalyst in above US patent is a very different system and cannot be compared with six and seven membered systems.

Synthesis of imine is known in the art and there are ample reports. However, synthesis of imine, in presence of an acid (carboxylic or sulfonic) for the said ligand is not reported.

PCT Appl. No. 2013020896 claims the synthesis of iminonaphthol ligands and their metal complexes. The patent deals with the synthesis of naphthoxy-imine ligands and their metal complexes. However, it does not report, even remotely any sulfonate or carboxylate system. Therefore, this document is limited to naphthoxy-imine ligands and corresponding metal complexes only. Inventor patent application is beyond the claims of this patent.

The following examples, which include preferred embodiments, will serve to illustrate the practice of this invention, it being understood that the particulars shown are by way of example and for purpose of illustrative discussion of preferred embodiments of the invention.

EXAMPLES

Example 1 (a): Synthesis of 2-(((2,3,4,5,6-pentaflourophenyl)imino)methyl) benzenesulfonic acid (L1)

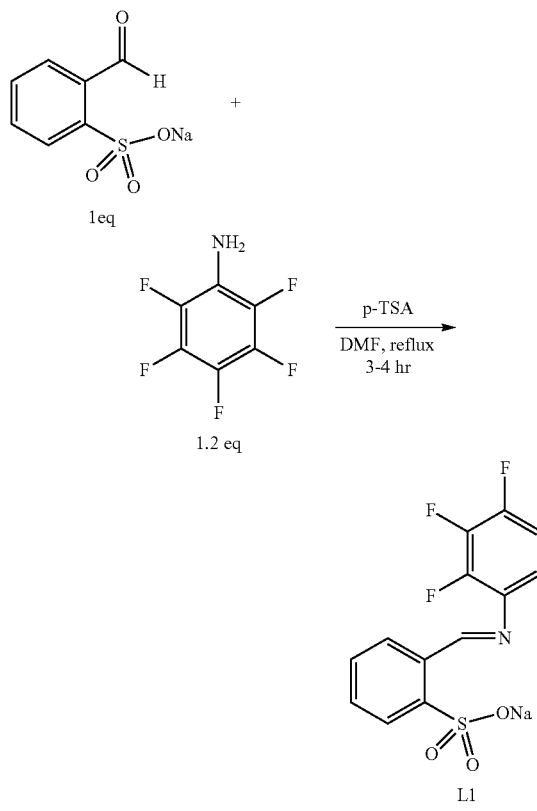

To a stirred mixture of sodium salt of 2-formylbenzenesulfonic acid (10.4 gm, 50 mmol) and 2,3,4,5,6-pentafluoroaniline (10.9 gm, 50 mmol) in dry DMF (500 mL) was added in presence of p-toluenesulfonic acid (200 mg) at room temperature. The resulting mixture was stirred at 155-160° C. reflux temperature for 4 h and concentration of the reaction mixture in vacuo afforded a crude solid. Purification by column chromatography on silica gel using Ethylacetate/Methanol (9/1) as eluent gave sodium 2-(((perfluorophenyl) imino) methyl)benzenesulfonate as white solid in 32% yield.

$^1$H NMR (CD$_3$OD) δ 9.68 (s, 1H, C—H of imine), 8.35 (d, 1H, Ar—H), 8.07 (d, 1H, Ar—H), 7.63 (m, 2H, Ar—H), 7.8 (m, 1H, aromatic-H), 7.23-7.26 (m, 1H, aromatic-H), 7.47 (dd, J$_{H-H}$=7.7, 1.5 Hz, 1H, aromatic-H), 8.81 (s, 1H, CHdN), 12.88 (s, 1H, COOH). $^{13}$C NMR (CD$_3$OD) δ 168, 146, 140, 138, 137, 132, 131, 130, 128, 127, 125.

Example 1 (b): Synthesis of Bis[2-(((2,3,4,5,6-pentaflourophenyl)imino)methyl) benzenesulfonato] titanium(IV) Dichloride (M1)

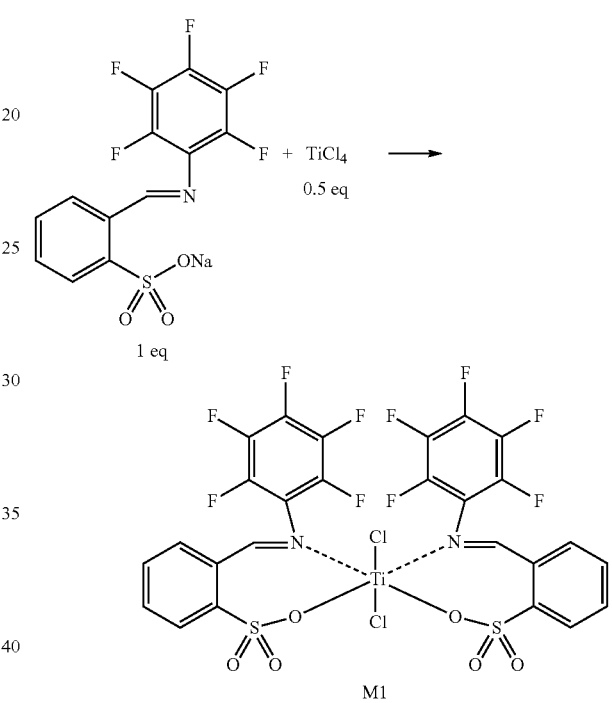

To a stirred solution of sodium 2-(((perfluorophenyl) imino)methyl)benzenesulfonate L1(4.24 g, 5 mmol) in dried dimethyl formamide (15 mL) was added 1M toluene solution of TiCl$_4$ (2.5 mL, 5.00 mmol) dropwise over a 10-min period at −78° C. The reaction temperature was maintained for 30 min. with constant stirring. The mixture was allowed to warm to room temperature and stirred for 18 h. Concentration of the reaction mixture in vacuo gave a crude product. Dried CH$_2$Cl$_2$ (50 mL) was added to the crude product, and the mixture was stirred for 15 min. and then filtered. The solid residue was washed two times with dried hexane (30 mL each), and the combined organic filtrates were concentrated in vacuo to afford a reddish brown solid.

$^1$H NMR (CDCl$_3$) δ=9.47 (s, 2H, imine-CH), 8.30 (s, 2H, Ar—H), 8.11 (s, 2H, Ar—H), 7.52 (s, 4H, Ar—H).

Example 2: Ethylene Polymerization using Bis[2-(((2,3,4,5,6-pentaflourophenyl) imino)methyl)benzenesulfonato]titanium(IV) Dichloride (M1) as a Catalyst A dried Buchi reactor equipped with overhead stirrer, thermometer probe was heated at 80° C. temperature under vacuum for 60 min. Under this temperature the reactor was pressurized with argon gas for 40 minutes. Dried toluene is introduced to the reaction flask, followed by addition of 20% MAO out of required amount, and argon is bubbled through the solvent for 40 min under stirring. The argon is then replaced by ethylene gas, which is left bubbling through the solvent. After 30 min, the 70% amount of MAO is introduced, and the reaction flask is then placed at the desired temperature. When the requisite temperature is reached, the polymerization is initiated by addition of the precatalyst {Bis[2-(((2,3,4,5,6-pentaflourophenyl) imino)methyl) benzenesulfonato]titanium(IV) Dichloride} previously dissolved in 2 mL of dry dimethyl formamide/dimethyl sulfoxide and activated by remaining 10% of MAO solution. After the required polymerization time, the polymerization is quenched by addition of an acidified MeOH solution. The resulting polyethylene is filtered, washed with copious amounts of methanol/acetone, and dried overnight in a vacuum oven at 40° C. Polymer yield: 0.096 mg. Catalyst activity: 960 kg-polymer/mmol Ti/h. Melting temperature (Tm): 134.36° C.

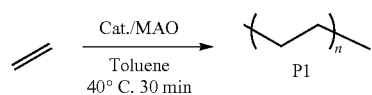

Example 3 (a): Synthesis of 2-(((4-methoxybenzylidene)amino)benzoic acid (L2)

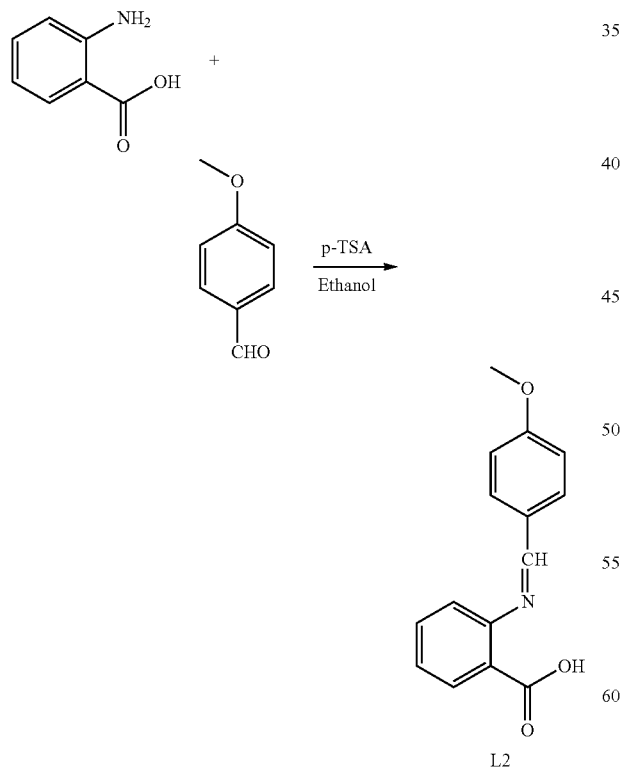

To a stirred mixture of 2-aminobenzoic acid (6.8 gm, 50 mmol) and 4-methoxybenzaldehyde (6.1 gm, 50 mmol) in ethanol (500 mL) was added p-toluenesulfonic acid (300 mg) at room temperature. The resulting mixture was stirred at temperature 78° C. for 6 h and concentrated in vacuo that afforded a crude reaction mixture. Purification by column chromatography on silica gel using ethyl acetate/pet-ether (9/1) as eluent gave 2-(((4-methoxybenzylidene)amino)benzoic acid (L2) as off white solid in 92% yield.

$^1$H NMR (CDCl$_3$) δ=14.98 (s, br, Ar—COOH), 8.64 (s, 1H, imine C—H), 8.34 (d, 1H, Ar—H), 7.88 (d, 2H, Ar—H), 7.60 (t, 1H, Ar—H), 7.46 (m, 2H, Ar—H), 7.05 (d, 2H, Ar—H), 3.90 (s, 3H, O—CH3). $^{13}$C NMR (CDCl$_3$) δ=190.6, 167.2, 163.8, 159.6, 150.8, 146.9, 134.5, 133.6, 132.5, 131.7, 127.4, 126.2, 123.7, 116.4, 114.6, 114.0, 55.3.

Example 3 (b): Synthesis of Bis[2-(((4-methoxybenzylidene)amino)benzoate]Ti(IV) Dichloride (M2)

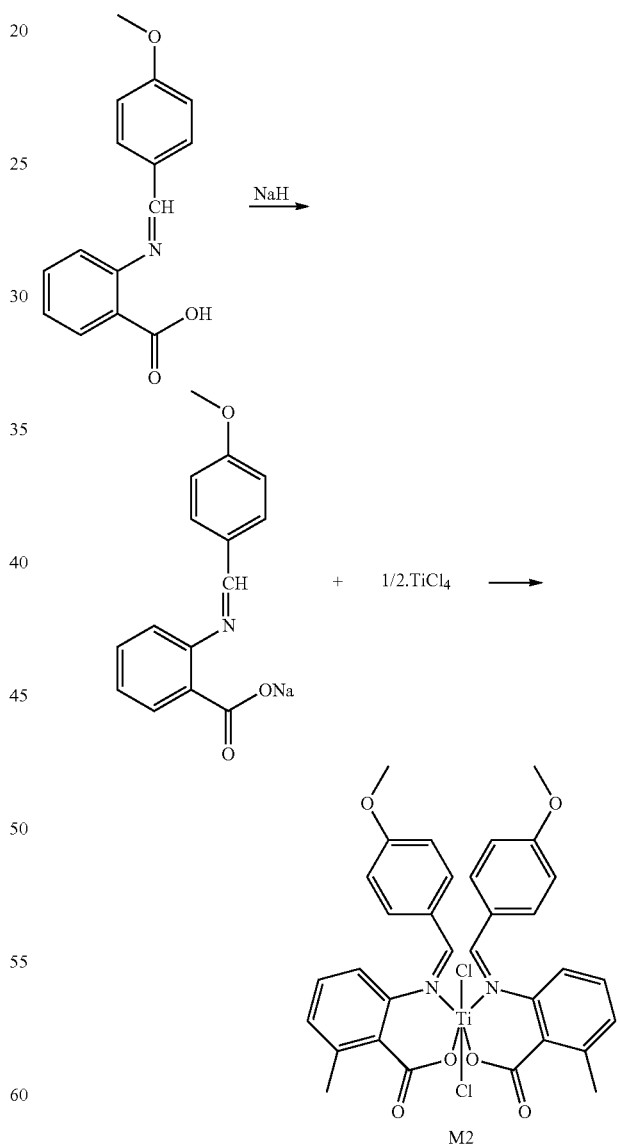

To a stirred solution of 2-(((4-methoxybenzylidene) amino)benzoic acid (L2) (1.38 g, 5 mmol) in dried solvent mixture of dichloromethane (50 mL), THF (20 mL) comprising NaH (0.122 g, 5.25 mmol) was added dropwise over the period of 10 min at room temperature under argon. The reaction mixture was stirred for 4 h. The resulting solution was added dropwise over a 10-min period to a 1M toluene solution of TiCl$_4$ (2.5 mL, 2.5 mmol) in dried THF (50 mL) at −78° C. to 0° C. The mixture was allowed to warm to room temperature and stirred for 18 h. Concentration of the reaction mixture in vacuo gave a crude product. Dried hexane (50 mL) was added to the crude product, and the mixture was stirred for 15 min and then filtered. Diethyl ether (30 mL) and n-hexane (120 mL) were added to the solid, and the mixture was stirred for 60 min and then filtered. The resulting solid was washed with n-hexane (20 mL) and dried in vacuo to give required complex M2 as a reddish brown solid in 42% yield.

$^1$H NMR (CD$_2$Cl$_2$) δ=8.69 (s, 2H, imine C—H), 8.30 (d, 1H, Ar—H), 7.93 (m, 4H, Ar—H), 7.68 (m, 1H, Ar—H), 7.52 (m, 4H, Ar—H), 7.10 (m, 4H, Ar—H), 6.72 (m, 2H, Ar—H), 3.91 (d, 6H, O—CH$_3$).

Example 4: Ethylene Polymerization using Bis[2-(((4-methoxybenzylidene)amino)benzoate]Ti(IV) Dichloride (M2) as a catalyst A dried Buchi reactor equipped with a overhead stirrer, thermometer probe was heated at 80° C. temperature under vacuum for 60 min. Under this temperature the reactor was pressurised with argon gas for 40 minutes. Dried toluene is introduced to the reaction flask, followed by addition of 20% MAO out of required amount, and argon is bubbled through the solvent for 40 min under stirring. The argon is then replaced by ethylene gas, which is left bubbling through the solvent. After 30 min, the 70% amount of MAO is introduced, and the reaction flask is then placed at the desired temperature. When the requisite temperature is reached, the polymerization is initiated by addition of the precatalyst {Bis[2-(((4-methoxybenzylidene)amino)benzoate]Ti(IV) Dichloride (M2)} previously dissolved in 2 mL of dry dimethyl formamide/dimethyl sulfoxide and activated by remaining 10% of MAO solution. After the required polymerization time, the polymerization is quenched by addition of an acidified MeOH solution. The resulting polyethylene is filtered, washed with copious amounts of methanol/acetone, and dried overnight in a vacuum oven at 40° C. Polymer yield: 0.156 mg. Catalyst activity: 1560 kg-polymer/mmole Ti/h. Tm: 137.29° C.

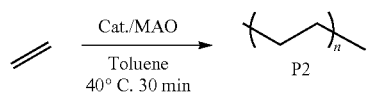

Advantages of Invention

1. Simple Iminecarboxylate or Iminesulfonate ligated metal complexes are used in the preparation of disentangle ultra high molecular weight polyethylene.
2. The Disentangle ultra high molecular weight polyethylene (dis-UHMWPE) prepared by using the catalyst of present invention has improved physical and mechanical properties such as chemical inertness, lubricity, impact resistance, and abrasion resistance.
3. The dis-UHMWPE prepared may find various applications such as bullet proof jackets, helmets, total joint replacement, spine implant, hip replacement, blood filters and high strength light weighted strong fibers and tapes.
4. The presence of acidic group in ligand framework will enhance the catalyst stability under given reaction conditions.

The invention claimed is:
1. An olefin polymerization catalyst comprising a metal complex of Formula (I)

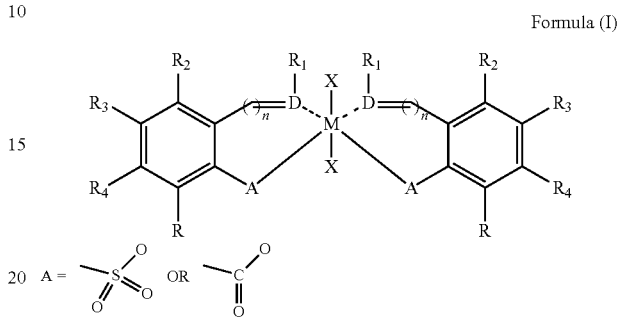

wherein
M is a transition metal atom of Group 3 to Group 11 of the periodic table;
A is sulfonate (SO$_3$) or carboxylate (CO$_2$);
when n=0, D=N=CH— or when n=1, D=N;
X=Cl, Br, I, BF$_4$, or OAc; and
R, and R$_1$ to R$_4$ are the same or different, and are each a hydrogen atom, a halogen atom, a hydrocarbon group, a heterocyclic group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

2. The olefin polymerization catalyst as claimed in claim 1, wherein said transition metal is selected from the group consisting of titanium, zirconium, hafnium, vanadium, ytterbium and niobium.

3. The olefin polymerization catalyst as claimed in claim 1, wherein said metal complex of Formula (I) is Bis[2-(((2, 3,4,5,6-pentaflourophenyl)imino)methyl)benzenesulfonato] titanium(IV) Dichloride or Bis[2-(((4-methoxybenzylidene) amino)benzoate]Ti(IV) Dichloride.

4. A process for the preparation of the catalyst as claimed in claim 1 comprising the steps of:
(a) stirring the reaction mixture of a sodium salt of an aldehyde and an amine in a suitable solvent in presence of an alkyl/aryl sulfonic acid followed by refluxing the reaction mixture at a temperature ranging from 140 to 160° C. for the period ranging from 4 to 6 hours to obtain an imine compound; and
(b) adding an organic solvent solution of a metal halide to a stirred solution of the imine compound of step (a) in a suitable solvent at the temperature ranging from −78° C. to 80° C. followed by stirring the reaction mixture for the time period ranging from 18 to 20 hours at the temperature ranging from 25° C. to 40° C. to obtain the metal complex of Formula (I) wherein A is sulfonate group.

5. The process as claimed in claim 4, wherein said sodium salt of an aldehyde is a sodium salt of 2-formylbenzenesulfonic acid, sodium 2-formyl-6-methylbenzenesulfonate, or sodium 2-(tert-butyl)-6-formylbenzenesulfonate.

6. The process as claimed in claim 4, wherein said amine is aliphatic or aromatic.

7. The process as claimed in claim 4, wherein said solvent of step (a) is dimethyl formamide, dimethyl sulfoxide, methanol, acetonitrile, or benzonitrile.

8. The process as claimed in claim 4, wherein said alkyl/aryl sulfonic acid is p toluenesulfonic acid, methane sulfonic acid, or trifluromethane sulfonic acid.

9. The process as claimed in claim 4, wherein said organic solvent of step (b) is toluene, heptane, decane, or xylene.

10. The process as claimed in claim 4, wherein said metal halide is titanium tetrachloride, zirconium tetrachloride, titanium tetrabromide, or zirconium tetrabromide.

11. The process as claimed in claim 4, wherein said solvent of step (b) is dimethyl formamide, dimethyl sulfoxide, toluene, diethyl ether, or dioxane.

12. A process for the preparation of the catalyst as claimed in claim 1 comprising the steps of:
   (a) stirring the reaction mixture of an aldehyde and an amine in a suitable solvent in presence of an alkylsulfonic acid followed by refluxing the reaction mixture at temperature ranging from 65 to 70° C. for the period ranging from 4 to 6 hours to obtain an amino compound;
   (b) adding an alkyllithium/ n-hexane solution to a stirred solution of step (a) in a solvent at the temperature ranging from −78° C. to −80° C. followed by stirring the reaction mixture for the time period ranging from 3 to 4 hours at the temperature ranging from 25° C. to 40° C.; and
   (c) adding a solution of a metal halide in an organic solvent to a solution of step (b) at the temperature ranging from −78° C. to 80° C. followed by stirring the reaction mixture for the time period ranging from 18 to 20 hours at the temperature ranging from 25° C. to 40° C. to obtain the metal complex of Formula (I) wherein A is carboxylate group.

13. The process as claimed in claim 12, wherein said amine is 2-amino-6-methylbenzoic acid, anthranilic acid, or 2-amino-6-tert-butylbenzoic acid.

14. The process as claimed in claim 12, wherein said aldehyde is 2,3,4,5,6-pentafluorobenzaldehyde, 2,6-difluorobenzaldehyde, anisaldehyde, or benzaldehyde.

15. The process as claimed in claim 12, wherein said solvent of step (a) is a polar solvent.

16. The process as claimed in claim 12, wherein said solvent of step (b) is tetrahydrofuran, toluene, diethyl ether, or dioxane.

17. The process as claimed in claim 12, wherein said organic solvent is toluene, xylene, hexane, or heptane.

18. The process as claimed in claim 12, wherein said metal halide is titanium tetrachloride, zirconium tetrachloride, titanium tetrabromide, or zirconium tetrabromide.

19. A process for the preparation of a disentangled ultra high molecular weight polyethylene using said polymerization catalyst as claimed in claim 1 in the presence of a co-catalyst comprising the steps of:
   (a) mixing the co-catalyst in a solvent followed by pressurizing the ethylene gas in reaction vessel; and
   (b) polymerizing ethylene by dissolving the polymerization catalyst in a solvent at the temperature ranging from 0 to 45° C.

20. The process as claimed in claim 19, wherein said co-catalyst is selected from the group consisting of methylaluminoxane (MAO) and trialkylaluminium.

21. The process as claimed in claim 19, wherein said solvent of step (b) is a hydrocarbon.

22. The process as claimed in claim 19, wherein said polymerization temperature for preparation of the disentangled ultra high molecular weight polyethylene is ranging from 0 to 45° C.

23. The process as claimed in claim 19, wherein said polymerization reaction is carried out in continuous or batch mode.

24. The process as claimed in claim 19, wherein said polymerization is carried out under a pressure of 1 to 10 bars.

25. The process as claimed in claim 19, wherein the concentration of said polymerization catalyst is in the range of 1 to 10 µmol.

26. The process as claimed in claim 19, wherein said co-catalyst comprise a scavenger.

27. The process as claimed in claim 19, wherein the average molecular weight of said disentangled ultra high molecular weight polyethylene is ranging from 1 to 10 million g/mol.

28. The olefin polymerization catalyst as claimed in claim 1, wherein $R_1$ is an aromatic group, or mono, di, tri, tetra, penta substituted phenyl, in which one or more or all five substituent is F, Cl, Br, or I.

29. The process as claimed in claim 4, wherein said amine is an aromatic amine.

30. The process as claimed in claim 4, wherein said amine is 2,3,4,5,6-pentafluoroaniline.

31. The process as claimed in claim 4, wherein said aldehyde is 2,6-difluorobenzaldehyde, anisaldehyde, or benzaldehyde.

32. The process as claimed in claim 12, wherein said solvent of step (a) is an alcohol.

33. The process as claimed in claim 12, wherein said solvent of step (a) is methanol, ethanol, or propanol.

34. The process as claimed in claim 19, wherein said solvent of step (b) is a saturated hydrocarbon.

35. The process as claimed in claim 19, wherein said solvent of step (b) is toluene, xylene, heptane, or decane.

36. The process as claimed in claim 19, wherein said polymerization temperature for preparation of disentangled ultra high molecular weight polyethylene is ranging from 35 to 40° C.

37. The process as claimed in claim 26, wherein said scavenger is triethylaluminium, triisobutylaluminum, tris-n-octylaluminium, tetraisobutyl-dialuminoxane, diethyl zinc, tris-n-hexyl aluminum or diethylchloro aluminum.

* * * * *